United States Patent
Cooper (10) Patent No.: US 10,642,651 B2
(45) Date of Patent: May 5, 2020

(54) SYSTEMS, METHODS AND DEVICES FOR STANDBY POWER SAVINGS

(71) Applicant: INTEL CORPORATION, Santa Clara, CA (US)

(72) Inventor: Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 15/191,283

(22) Filed: Jun. 23, 2016

(65) Prior Publication Data

US 2017/0371738 A1 Dec. 28, 2017

(51) Int. Cl.
*G06F 11/00* (2006.01)
*G06F 9/48* (2006.01)

(52) U.S. Cl.
CPC .......... *G06F 9/4893* (2013.01); *Y02D 10/24* (2018.01)

(58) Field of Classification Search
CPC .............................. G06F 9/4893; Y02D 10/24
USPC .......................................................... 714/15
See application file for complete search history.

(56) References Cited

U.S. PATENT DOCUMENTS

| | | | |
|---|---|---|---|
| 10,107,343 B2* | 10/2018 | Robert | F16D 61/00 |
| 2006/0041767 A1* | 2/2006 | Maxwell | G06F 1/3209 713/323 |
| 2009/0089603 A1 | 4/2009 | Ding et al. | |
| 2010/0250748 A1 | 9/2010 | Sivasubramanian et al. | |
| 2012/0309321 A1 | 12/2012 | Agarwal et al. | |
| 2015/0078237 A1 | 3/2015 | Pingili et al. | |
| 2015/0100801 A1* | 4/2015 | Maity | G06F 1/3206 713/320 |
| 2015/0205335 A1* | 7/2015 | Teshome | G06F 1/3206 713/300 |
| 2016/0111134 A1* | 4/2016 | Kim | G11C 5/143 365/226 |
| 2016/0141874 A1* | 5/2016 | Hunt | H02J 3/14 700/296 |

FOREIGN PATENT DOCUMENTS

| | | |
|---|---|---|
| WO | 2013062564 A1 | 5/2013 |
| WO | 2014202950 | 12/2014 |

OTHER PUBLICATIONS

Wikipedia "ACPI" page, from date Jun. 4, 2016, retrieved using the WayBackMachine from https://web.archive.org/web/20160604110516/https://en.wikipedia.org/wiki/Advanced_Configuration_and_Power_Interface (Year: 2016).*

(Continued)

*Primary Examiner* — Yair Leibovich
(74) *Attorney, Agent, or Firm* — Green, Howard & Mughal LLP (57) ABSTRACT

A power delivery system of a computing system that is on alternating current (AC) power limits software administrative tasks to a system-controlled and tunable broadcast window. This window limitation allows a computing system to enter and stay in low-power states without variable disturbances from administrative functions that can be relegated to the window. For example, maintenance is restricted until the computing system broadcasts a notification. Legacy software and devices that do not understand these notifications can be told the AC power is not present nominally, and then be notified of AC power presence during maintenance intervals.

21 Claims, 6 Drawing Sheets

(56) References Cited

OTHER PUBLICATIONS

PCT/US2017/034195, International Search Report and Written Opinion, dated Aug. 28, 2017, 17 pages.
Extended European Search Report from European Patent Application No. 17815893.7 dated Feb. 5, 2020, 11 pgs.

* cited by examiner

SYSTEMS, METHODS AND DEVICES FOR STANDBY POWER SAVINGS

TECHNICAL FIELD

The present disclosure relates to power delivery to computing systems and more specifically relates to energy use efficiency in idle systems.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a power delivery system of a computing system which is on alternating current (AC) power to limit software administrative tasks to a system-controlled and tunable broadcast window. For example, maintenance is restricted until the computing system broadcasts a notification. Legacy software and devices that do not understand these notifications can be told the AC power is not present nominally, and then be notified of AC power presence during maintenance intervals.

For example, while operating on AC power, the system will broadcast a notification to the operating system (OS), applications and/or drivers to regulate requests to the system for the performance of administrative tasks. Administrative tasks can include tasks such as file maintenance, virus scanning, and software updates.

In some embodiments, the system notifies the OS, drivers and software of a defined window for the execution of administrative tasks. In one embodiment, the system suppresses requests from drivers and overlaying software for processing time by reporting that the system is operating on battery power until within the maintenance window, even when the system is operating on AC power. Components unable to process the broadcast identifying the maintenance window withhold requests for system services until being notified that the system is on AC power. By using a maintenance window, a system employing SOix sleep state can achieve a core C6 power state, followed by a platform C10 power state more consistently.

It should be recognized that while specific C-states and RT-states are mentioned, they are presented as an example of a system process. For example, system hardware can pick a state dynamically at any time, even without waking OS up. The system can be in a C2-C10 state depending on what is occurring. In another example, devices do not have to transition back to RTD0 on every C0 maintenance window start. The devices can be brought up as needed. For example, a majority of devices outside of comms and storage may not be needed for maintenance.

Two types of sleeping state models can be supported in modern OSes. A first sleeping state model is Sx. Sx involves notifying applications and drivers, and then powering off the bulk of the hardware with the memory left in self-refresh. Sx use can result in long latency transitions (which can be on the order of seconds) as the system basic input/output system (BIOS) performs pre-OS execution to ready the system for a handoff to the OS. A second sleeping state model is SOix. In SOix, the OS dynamically places devices in lower power states (which may, in turn, be powered off the system BIOS and hardware known as runtime D3 device power state (RTD3) from runtime D0 (RTD0)), and then places threads and/or cores in a low-power C state from a high power C state such as a normal operating state (C0). This low-power C state can map to a core C6, which, in turn, enters a platform C10 state (assuming the devices are inactive and allow for such a state). In this state, the system on a chip (SoC) is capable of achieving low power levels and can allow the system to wake faster than using an Sx-based approach (e.g., under 300 ms for SOix versus over 1 second for Sx).

In some computer system designs, low-power states are power-optimized in battery-powered configurations. For energy-efficient desktop computer systems, these capabilities can be used in AC power configurations. In order to achieve a low-power floor, software maintenance activities, such as file system maintenance, virus scanning, and software updates, are deferred in modern-day OSes to when a machine is connected to AC power. Stringent energy regulations are putting pressure on achieving a dramatic reduction in AC power consumption on desktop computing systems (e.g., reducing long idle screen off power from 22-25 W to under 10 W at the wall). To meet such regulations and/or low-power objectives, a system can ensure that the idle floor is properly testable and clear of maintenance activity, and that the overall net average power consumption across a day in the life of the system is also similarly energy constrained and tunable. A mechanism to trigger software maintenance and updates that will occur within bounded specified and broadcast maintenance intervals can help achieve this objective.

Throughout this disclosure, a hyphenated form of a reference numeral refers to a specific instance of an element, and the unhyphenated form of the reference numeral refers to the element generically or collectively. Thus, widget 12-1 refers to an instance of a widget class, which may be referred to collectively as widgets 12, and any one of which may be referred to generically as a widget 12.

Figure 1:
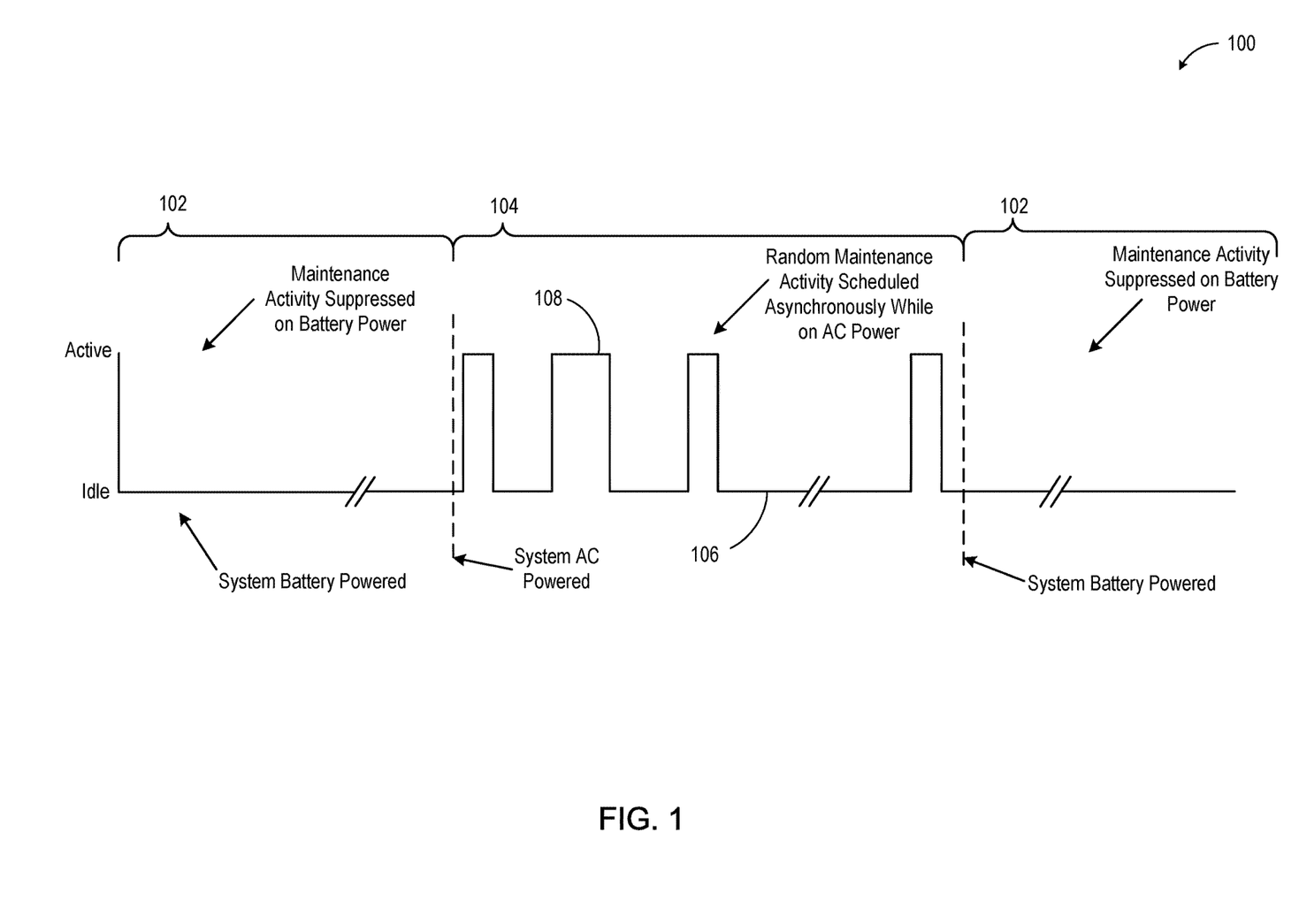
FIG. 1 is an example illustration of system maintenance activity and idling with respect to system power state changes in a computing system consistent with embodiments disclosed herein.

FIG. 1 is an example illustration of system maintenance activity 108 and idling 106 with respect to system power state changes 102, 104 in a computing system. The computing system is on battery power during the battery-powered time periods 102 and on AC power during the AC-powered time period 104. System activity is at a low state 106 during the battery-powered time periods 102. System activity varies between high activity 108 and low activity 106 during the AC-powered time period 104, which can be due to deferred maintenance.

During the times of low activity 106, the system can use an SOix model in which the OS can dynamically place devices in low-power states (which may in turn be powered off by the system BIOS and RTD3). The system can then place the threads/cores in a lowest power C state. This can map to a core C6 power state. When the cores are at a C6 power state, the platform (assuming the devices are inactive and allow for such a state) can enter a platform C10 power state. In this C10 state, the SoC is capable of achieving low power levels, while allowing the system to wake much faster than an Sx-based approach (e.g., less than 300 ms for SOix versus greater than 1 second for Sx in some cases).

In the embodiment shown, while the system is AC powered, maintenance activity can run at any time and with unlimited bounds. These unlimited bounds result in an idle power penalty because this activity is unaligned and unbounded.

While the system is on battery power, the system can emphasize achieving a low-power floor. To achieve a low-power floor, software maintenance activities such as file system maintenance, virus scanning, and software updates may be deferred in modern-day OSes, such as a standby mode, to when the system is connected to AC power.

Figure 2:
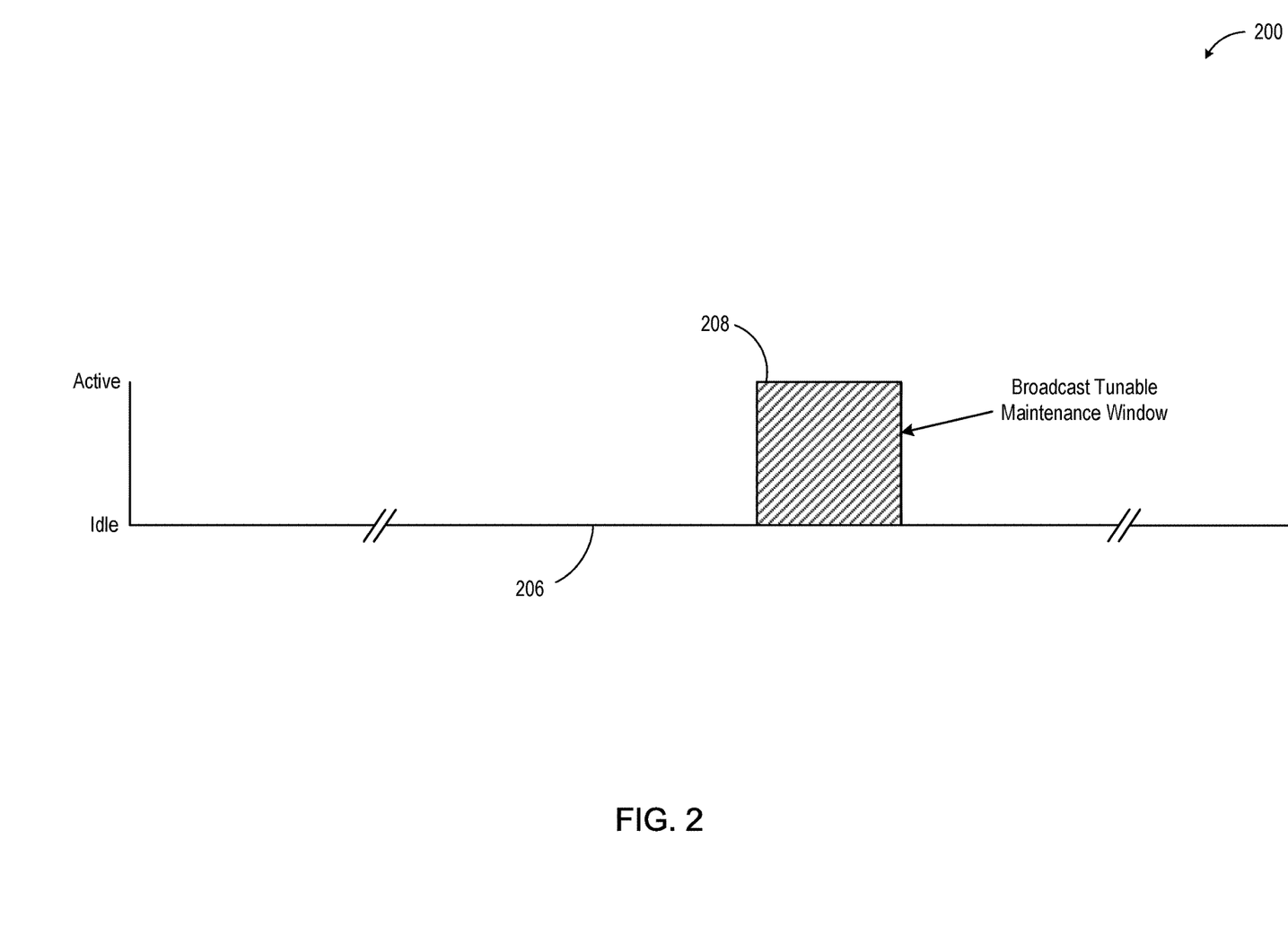
FIG. 2 is an illustration of system maintenance activity and idling with respect to a system-tunable maintenance window in a computing system on AC power consistent with embodiments disclosed herein.

FIG. 2 is an illustration of system maintenance activity and idling with respect to a system-tunable maintenance window 208 in a computing system on AC power. In the embodiment shown, the system is restricted to an idle state 206 for maintenance activities except during the configurable maintenance window 208. During the maintenance window 208, the system is available to exit a low-power state and become active to perform maintenance functions. The maintenance window 208 is broadcast to the system by a notification interface.

In some embodiments, an OS application programming interface (API) allows software and devices to register to the notification interface and be notified when they can perform background updates, maintenance or additional processing. The notification interface can be tunable by the end-user, information technology (IT) department, or system manufacturer. The tuning parameters can include: maintenance window triggers on specific time; maintenance window triggers on network events; maintenance interval durations (time); and maintenance interval cycles (such as a percent load parameter).

An OS can include one or more interfaces. In an embodiment, an interface for software and/or drivers indicates the presence of a notification interface. In another embodiment, an interface for software and/or drivers provides registration for notification. In one embodiment, an interface for the platform enables programming activity window parameters and/or registry entries. In some embodiments, the interface can provide a callback notification mechanism on activity window start/stop.

In the embodiment shown, maintenance activity is restricted until the system broadcasts a notification. Software and devices compliant with the maintenance window notification perform maintenance activity during the broadcast maintenance window. In an embodiment, legacy software and devices that do not understand these broadcast messages are told that AC power is not present during the period outside the maintenance window, and are notified of AC power presence during maintenance intervals.

Energy regulations can place pressure to achieve a reduction in AC power consumption on desktop computing systems. In some embodiments, ensuring that the idle floor is properly testable and clear of maintenance activity can aid in achieving the reduction. By limiting maintenance operations to the maintenance window, an overall net average power consumption across a day in the life of the computing system can be further energy-constrained. For example, a computing system is idle 206 until the system triggers software maintenance and updates that will occur within a bounded, specified and broadcast maintenance interval 208. Once the maintenance interval 208 ends, the system may return to idle 206.

Figure 3:
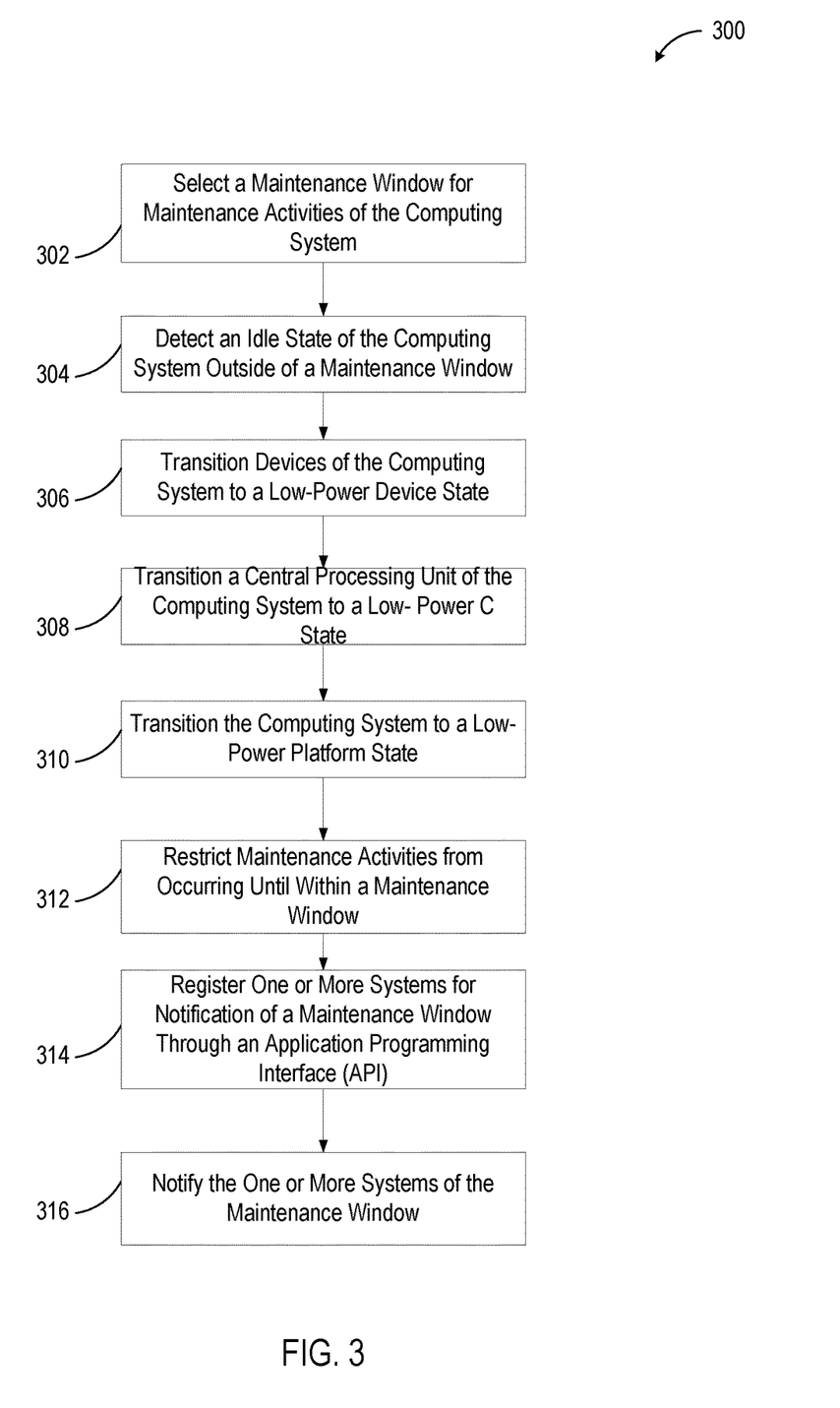
FIG. 3 illustrates a method of standby power savings consistent with embodiments disclosed herein.

FIG. 3 illustrates a method of standby power savings. The method can be accomplished by systems including the systems shown in FIGS. 4-6, including a power control unit 424 and an operating system interface 426. In block 302, the system selects a maintenance window for maintenance activities of the computing system. In block 304, the system detects an idle state of the computing system outside of a maintenance window. In block 306, the system transitions devices of the computing system to a low-power device state. In block 308, the system transitions a CPU of the computing system to a low-power C state. In block, 310, the system transitions the computing system to a low-power platform state. In block 312, the system restricts maintenance activities from occurring until within a maintenance window. In block 314, the system registers one or more systems or components for notification of the maintenance window through an API. In block 316, the system notifies the one or more systems (also known as registered components) of the maintenance window.

Figure 4:
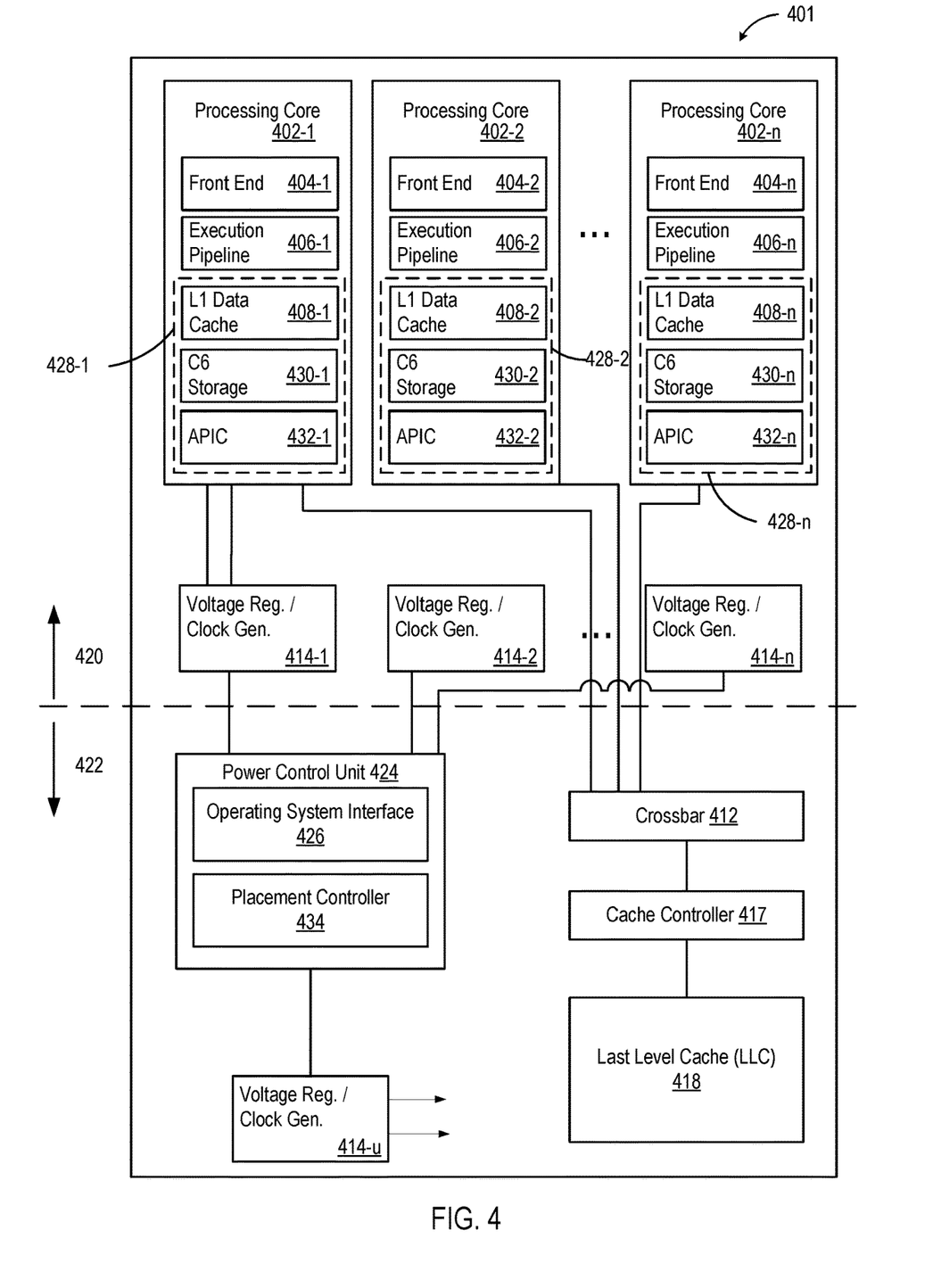
FIG. 4 illustrates a multicore processer used in conjunction with at least one of the embodiments disclosed herein.

FIG. 4 illustrates a multicore processor used in conjunction with at least one embodiment. In at least one embodiment, a processor 401 includes a core region 420 and an uncore 422. In some embodiments, the core region 420 includes multiple processing cores 402, but disclosed functionality may be applicable to single-core processors in a multi-processor system. In some embodiments, the processor 401 includes a first processing core 402-1, a second processing core 402-2, and so forth through an n-th processing core 402-*n*.

In some embodiments, the processing cores 402 include sub-elements or clusters that provide different aspects of overall functionality. In some embodiments, the processing cores 402 include a front end 404, an execution pipeline 406, and a core periphery 428. The core periphery 428 can include a first level (L1) data cache 408, a C6 storage 430 and an advanced programmable interrupt controller (APIC) 432. In at least one embodiment, the front end 404 is operable to fetch instructions from an instruction cache (not depicted) and schedule the fetched instructions for execution. In some embodiments, the execution pipeline 406 decodes and performs various mathematical, logical, memory access and flow control instructions in conjunction with a register file (not depicted) and the L1 data cache 408. Thus, in some embodiments, the front end 404 may be responsible for ensuring that a steady stream of instructions is fed to the execution pipeline 406 while the execution pipeline 406 may be responsible for executing instructions and processing the results. In some embodiments, the execution pipeline 406 may include two or more arithmetic pipelines in parallel, two or more memory access or load/store pipelines in parallel, and two or more flow control or branch pipelines. In at least one embodiment, the execution pipelines 406 may further include one or more floating point pipelines. In some embodiments, the execution pipelines 406 may include register and logical resources for executing instructions out of order, executing instructions speculatively, or both. A hyperthread core is a core that is capable of execution of two or more instructions in parallel. Each execution pipeline of a core is called a hyperthread. A hyperthread can be exposed to an OS as a logical core.

The core periphery 428 can include logic that supports the front end 404 and the execution pipeline 406, including managing storage and interrupts. The core periphery 428 can include the L1 data cache 408, the C6 storage 430 and the APIC 432. The C6 storage 430 can store a context (or state) of the processing core 402 when the processing core 402 transitions into a low-power state (such as a C6 state). A peripheral controller (e.g., the APIC 432) can manage interrupts for the processing core 402, including identifying which interrupts apply to the associated processing core 402 and managing an APIC ID which can be used to identify an associated core.

In at least one embodiment, during execution of memory access instructions, the execution pipeline 406 attempts to execute the instructions by accessing a copy of the applicable memory address residing in the lowest-level cache memory of a cache memory subsystem that may include two or more cache memories arranged in a hierarchical configuration. In at least one embodiment, a cache memory subsystem includes the L1 data caches 408 and a last level cache (LLC) 418 in the uncore 422. In at least one embodiment, other elements of the cache memory subsystem may include a per-core instruction cache (not depicted) that operates in conjunction with the front end 404 and one or more per-core intermediate caches (not depicted). In at least one embodiment, the cache memory subsystem for the processor 401 includes L1 data and instruction caches per core, an intermediate or L2 cache memory per core that includes both instructions and data, and the LLC 418, which includes instructions and data and is shared among multiple processing cores 402. In some embodiments, if a memory access instruction misses in the L1 data cache 408, execution of the applicable program or thread may stall or slow while the cache memory subsystem accesses the various cache memories until a copy of the applicable memory address is found.

In at least one embodiment, the processor 401, the first processing core 402-1, the second processing core 402-2 and the processing core 402-n communicate via a crossbar 412, which may support data queuing, point-to-point protocols and multicore interfacing. Other embodiments of the processor 401 may employ a shared bus interconnect (not depicted) or direct core-to-core interconnections and protocols. In at least one embodiment, the crossbar 412 serves as an uncore controller that interconnects the processing cores 402 with the LLC 418. In some embodiments, the uncore 422 includes a cache controller 417 to implement a cache coherency policy and, in conjunction with a memory controller (not depicted), maintain coherency between a system memory (not depicted) and the various cache memories.

In at least one embodiment, a power control unit (PCU) 424 includes a placement controller 434. The placement controller 434 can monitor workloads of the processing cores 402 and determine which work can be moved to a different processing core 402 to increase efficiency. Efficiency can be measured in thermal output, power use and/or work accomplished. For example, efficiency can be increased by moving threads between cores that differ due to indie variation (lower thermal output, decreased power usage, lifetime use management or more work performed). Efficiency can be increased by maintaining a low-voltage operation of a core by not providing a workload above a threshold (i.e., moving threads between cores to prevent a core from operating above a threshold, which is also known as "stressing" a core). Efficiency can be increased by combining multiple threads upon a single hyperthreading core, which saves power of a multicore overhead. Efficiency can be increased by placing threads on cores that are physically separated to enable a larger spread of heat on the processor die. Efficiency can be increased by spreading heat by moving threads from physical processor to physical processor in sequence to heat different parts of a processor die. Efficiency can be increased by using cores with failed arithmetic units when instructions will not use the arithmetic units, and/or migrating threads between cores when the instructions will use the failed arithmetic units. Efficiency can be increased by performing load balancing for lifetime use management and/or thermal management.

In some embodiments, as a core is used and/or used to perform a large workload, the efficiency of the core decreases. The efficiency decrease can be due to a larger operating voltage and/or a larger thermal output. In some embodiments, a lifetime use of cores can be managed, and workloads transitioned between cores to spread the lifetime usage of cores. In one embodiment, the processor can report a lower core count than is actually available on the processor. The workload can be spread among cores to increase the overall lifetime and efficiency of the cores beyond what would be possible without the extra unreported cores. In some embodiments, threads can be transitioned off a core to sequester the core. The sequestered core can be tested and/or performance characteristics of the core can be determined. In one embodiment, core sequestering can be used in conjunction with virtual machine manager solutions. In other embodiments, a sequestered core can be used to support other dedicated-purpose, hidden execution arrangements.

In some embodiments, the hardware PCU 424 can decide thread placement among the core and hyperthread resources available. Logical processors can be enumerated to the OS. However, the number of logical processors can be less than a number of physical cores and/or hyperthreads that exist in the processor (i.e., there can be more processor resources than are enumerated to the OS). The OS places work on the logical processors visible to it, and the processor (e.g., the PCU 424) may at a later time migrate a thread to a different resource. For example, the PCU 424 can initiate a sequence that saves the core's context, restores the context to a different core, and redirects a local APIC ID of the previous core to the new core. This migration can occur at the core or thread level. Alternatively, the hardware can provide migration hints to the OS through an operating system interface 426, and the OS can move the work from one core or thread to another.

In at least one embodiment, the core region 420 includes, in addition to the processing cores 402, voltage regulator/clock generator (VRCG) circuits 414 for each processing core 402. In some embodiments, in conjunction with per-core supply voltage signals and clock frequency signals generated by the PCU 424 and provided to each processing core 402, the VRCG circuits 414 support per-core power states by applying a power state indicated by the applicable supply voltage signal and clock frequency signal to the applicable processing core 402, as well as to the uncore 422.

In some embodiments, the PCU 424 is further operable to select processing cores 402 for execution of specific threads and to migrate a thread and its corresponding performance objective or context information from a first core (e.g., the first processing core 402-1) to a second core (e.g., the second processing core 402-2), when the performance characteristics of the second processing core 402-2 make the second processing core 402-2 better suited to achieve a desired efficiency objective than the first processing core 402-1.

In some embodiments, the processor 401 may include a hybrid assortment of cores including, in addition to the processing cores 402, graphics cores and other types of core logic. In these hybrid core embodiments, the PCU 424 determines an optimal or desirable power state, not only for the processing cores 402, but also for these other types of core elements in the core region 420. Similarly, in at least one embodiment, the processor 401 includes a VRCG circuit 414-u that provides the power state for the uncore 422 and, in this embodiment, the PCU 424 may determine the optimal or preferred power states for the uncore 422. In some embodiments, the processor 401 supports individualized power states for each processing core 402, any other types of cores in the core region 420, and the uncore 422. Other embodiments may support one power state for the entire core region 420 and one power state for the uncore 422.

The PCU 424 can also include the operating system interface 426. In some embodiments, the PCU 424 can provide recommendations for work placement or migration to an OS through the operating system interface 426. The OS can then perform the thread migration between cores. For example, an OS may not have enough information to recognize that two logical processors are actually associated with one hyperthread core. The PCU 424 can recommend to the OS that two threads be consolidated on the two logical processors, which can eliminate multicore overhead.

Figure 5:
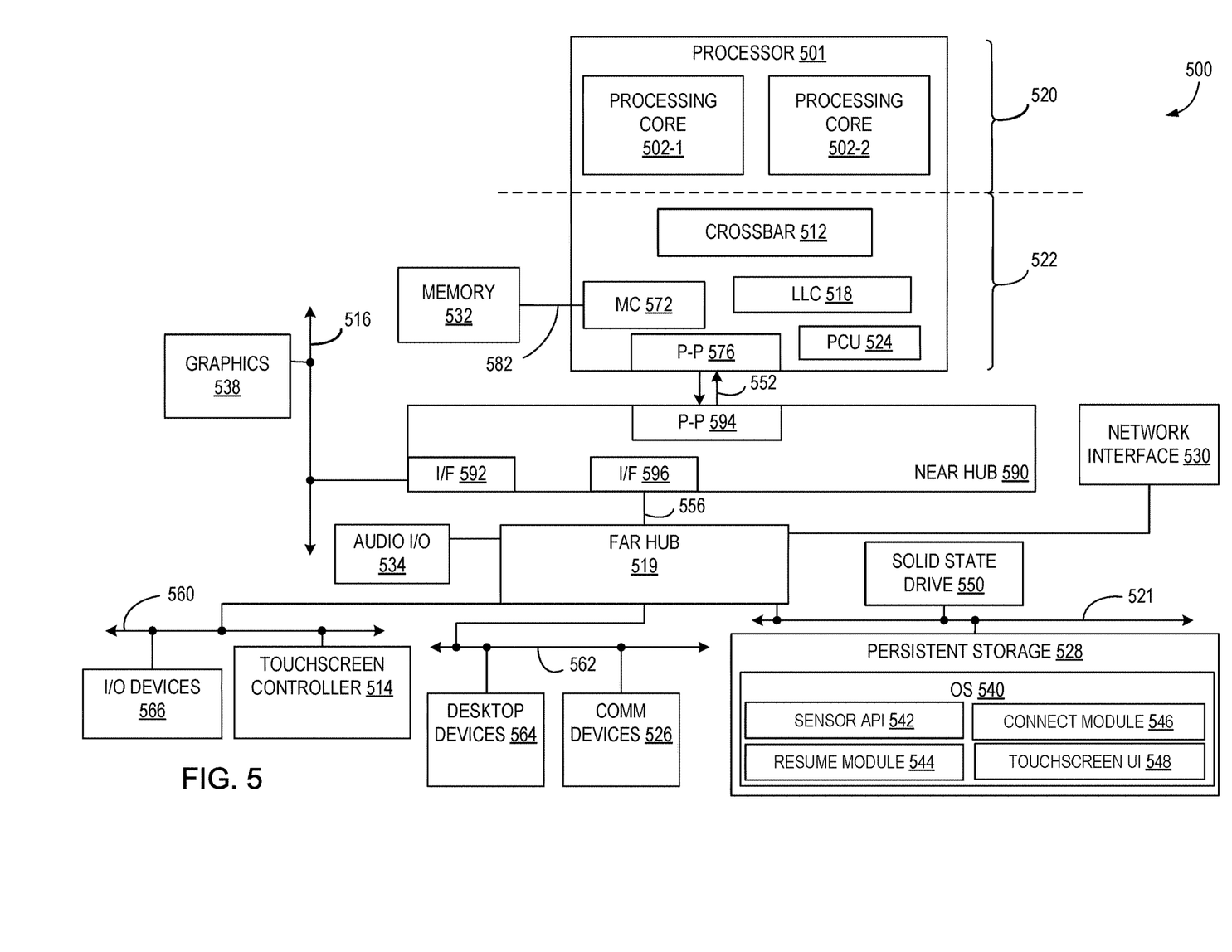
FIG. 5 illustrates a computer system used in conjunction with at least one of the embodiments disclosed herein.

Embodiments may be implemented in many different platforms. FIG. 5 illustrates a computer system 500 used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor is shown in in FIG. 5 for descriptive clarity, in various embodiments, a different number of processors may be employed using elements of the illustrated architecture.

In at least one embodiment, the system 500 is a point-to-point interconnect system and includes a processor 501. While in some embodiments the system 500 may include a single processor, in other embodiments the system 500 may support multiple processors. In at least one embodiment, the processor 501 is a multicore processor including the first processing core 502-1 and the second processing core 502-2. It is noted that other elements of the processor 501 besides the processing cores 502 may be referred to as the uncore 522, while the processing cores 502 may also be referred to as the core region 520. In different embodiments, a varying number of cores may be present in a particular processor. In at least one embodiment, the processing cores 502 may comprise a number of sub-elements (not shown in FIG. 5), also referred to as clusters, that provide different aspects of overall functionality. The processing cores 502 may, in some embodiments, each include a memory cluster (not shown in FIG. 5) that may comprise one or more levels of cache memory. In some embodiments, other clusters (not shown in FIG. 5) in the processing cores 502 may include a front-end cluster and an execution pipeline cluster. In at least one embodiment, the processing cores 502 may include an L1 data cache (not shown in FIG. 5). In some embodiments, the uncore 522 may include a crossbar 512, an LLC 518, a memory controller (MC) 572, a PCU 524 and a P-P interface 576. In some embodiments, the PCU 524 may be used to select a specific core based on the individual characteristics of each core on the die and the specifications of the task.

In particular embodiments, the processing cores 502 within the processor 501 are not equipped with direct means of communicating with each other, but rather communicate via the crossbar 512, which may include intelligent functionality such as cache control, data queuing, P-P protocols, and multicore interfacing. In some embodiments, the crossbar 512 may thus represent an intelligent uncore controller that interconnects the processing cores 502 with the MC 572, the LLC 518, and the P-P interface 576, among other elements. In particular, to improve performance in such an architecture, cache controller functionality within the crossbar 512 may, in some embodiments, enable selective caching of data within a cache hierarchy including the LLC 518 and one or more caches present in the processing cores 502. In at least one embodiment, the crossbar 512 is referred to as a global queue.

In at least one embodiment, the LLC 518 may be coupled to a pair of the processing cores 502, respectively. In some embodiments, the LLC 518 may be shared by the first processing core 502-1 and the second processing core 502-2. In some embodiments, the LLC 518 may be fully shared such that any single one of the processing cores 502 may fill or access the full storage capacity of the LLC 518. Additionally, in some embodiments, the MC 572 may provide for direct access by the processor 501 to a memory 532 via a memory interface 582. In some embodiments, the memory 532 may be a double-data rate (DDR) type dynamic random-access memory (DRAM), while the memory interface 582 and the MC 572 comply with a DDR interface specification. In at least one embodiment, the memory 532 may represent a bank of memory interfaces (or slots) that may be populated with corresponding memory circuits for a desired DRAM capacity.

In some embodiments, the processor 501 may also communicate with other elements of the system 500, such as a near hub 590 and a far hub 519, which are also collectively referred to as a chipset that supports the processor 501. In at least one embodiment, the P-P interface 576 may be used by the processor 501 to communicate with the near hub 590 via an interconnect link 552. In certain embodiments, the P-P interfaces 576, 594 and the interconnect link 552 are implemented using Intel® QuickPath Interconnect architecture. In at least one embodiment, the near hub 590 includes an interface 592 to couple the near hub 590 with a first bus 516, which may support high-performance I/O with corresponding bus devices, such as graphics 538 and/or other bus devices. In some embodiments, the graphics 538 may represent a high-performance graphics engine that outputs to a display device (not shown in FIG. 5). In at least one embodiment, the first bus 516 is a Peripheral Component Interconnect (PCI) bus, such as a PCI Express (PCIe) bus and/or another computer expansion bus. In some embodiments, the near hub 590 may also be coupled to the far hub 519 at an interface 596 via an interconnect link 556. In certain embodiments, the interface 596 is referred to as a south bridge. The far hub 519 may, in some embodiments, provide I/O interconnections for various computer system peripheral devices and interfaces, and may provide backward compatibility with legacy computer system peripheral devices and interfaces. Thus, in at least one embodiment, the far hub 519 provides a network interface 530 and an audio I/O 534, as well as interfaces to a second bus 560, a third bus 562, and a fourth bus 521, as will be described in further detail.

In some embodiments, the second bus 560 may support expanded functionality for the system 500 with I/O devices 566 and a touchscreen controller 514, and may be a PCI-type computer bus. In at least one embodiment, the third bus 562 may be a peripheral bus for end-user consumer devices, represented by desktop devices 564 and communication devices 526, which may include various types of keyboards, computer mice, communication devices, data storage devices, bus expansion devices, etc. In certain embodiments, the third bus 562 represents a Universal Serial Bus (USB) or similar peripheral interconnect bus. In some embodiments, the fourth bus 521 may represent a computer interface bus for connecting mass storage devices, such as hard disk drives, optical drives, and disk arrays, which are generically represented by a persistent storage 528 that may be accessible by the processor 501.

In at least one embodiment, the system 500 incorporates various features that facilitate a handheld or tablet type of operation and other features that facilitate laptop or desktop operation. In addition, in some embodiments, the system 500 includes features that cooperate to aggressively conserve power while simultaneously reducing latency associated with traditional power conservation performance objectives.

In at least one embodiment, the system 500 includes an operating system 540 that may be entirely or partially stored in the persistent storage 528. In some embodiments, the operating system 540 may include various modules, APIs, and the like that expose to varying degrees various hardware and software features of the system 500. In at least one embodiment, the system 500 includes a sensor application programming interface (API) 542, a resume module 544, a connect module 546, and a touchscreen user interface 548. In some embodiments, the system 500 may further include various hardware/firmware features including the capacitive or resistive touchscreen controller 514 and a second source of persistent storage such as a solid state drive (SSD) 550.

In some embodiments, the sensor API 542 provides application program access to one or more sensors (not depicted) that may be included in the system 500. Sensors that the system 500 might have in some embodiments include an accelerometer, a global positioning system (GPS) device, a gyrometer, an inclinometer, and a light sensor. The resume module 544 may, in some embodiments, be implemented as software that, when executed, performs operations for reducing latency when transitioning the system 500 from a power conservation performance objective to an operating performance objective. In at least one embodiment, the resume module 544 may work in conjunction with the SSD 550 to reduce the amount of SSD storage used when the system 500 enters a power conservation mode. The resume module 544 may, in some embodiments, flush standby and temporary memory pages before transitioning to a sleep mode. In some embodiments, by reducing the amount of system memory space that the system 500 uses to preserve upon entering a low-power state, the resume module 544 beneficially reduces the amount of time used to perform the transition from the low-power state to an operating performance objective. In at least one embodiment, the connect module 546 may include software instructions that, when executed, perform complementary functions for conserving power while reducing the amount of latency or delay associated with traditional "wake-up" sequences. The connect module 546 may, in some embodiments, periodically update certain "dynamic" applications including email and social network applications, so that, when the system 500 wakes from a low-power mode, the applications that are often most likely to refresh are up-to-date. In at least one embodiment, the touchscreen user interface 548 supports the touchscreen controller 514 that enables user input via touchscreens traditionally reserved for handheld applications. In some embodiments, the inclusion of touchscreen support in conjunction with support for the communication devices 526 enables the system 500 to provide features traditionally found in dedicated tablet devices as well as features found in dedicated laptop and desktop systems.

Figure 6:
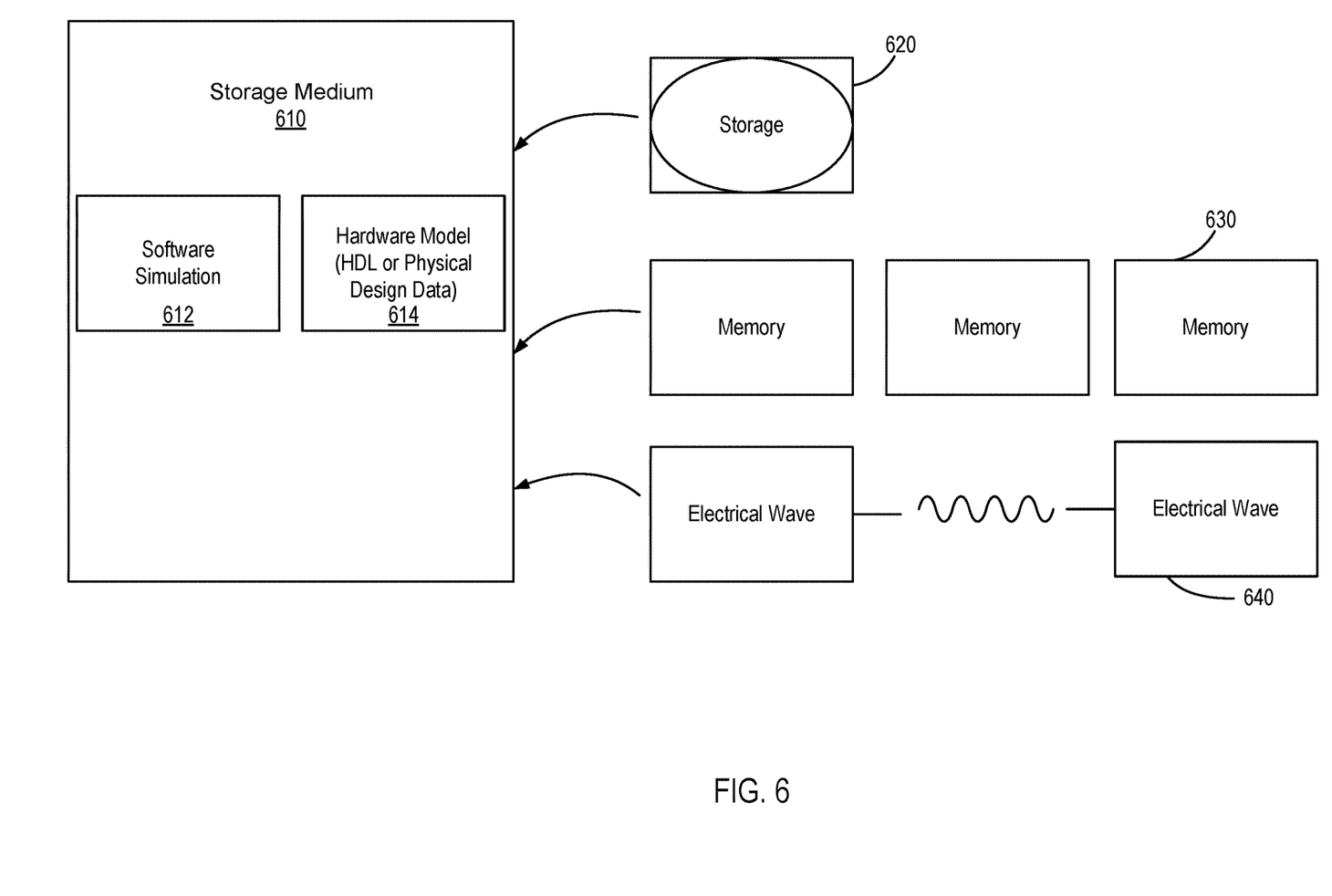
FIG. 6 illustrates a representation for simulation, emulation, and fabrication of a design implementing the embodiments disclosed herein.

FIG. 6 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, a hardware model 614 may be stored in a storage medium 610 such as a computer memory so that the hardware model 614 may be simulated using simulation software 612 that applies a particular test suite to the hardware model 614 to determine if it indeed functions as intended. In some embodiments, the simulation software 612 is not recorded, captured or contained in the storage medium 610.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine-readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine-readable medium. In some embodiments, an optical or electrical wave 640 modulated or otherwise generated to transmit such information, a memory 630, or a magnetic or optical storage 620 such as a disc may be the tangible machine-readable medium. Any of these media may "carry" the design information. The term "carry" (e.g., a tangible machine-readable medium carrying information) thus covers information stored on a storage device or information encoded or modulated into or onto a carrier wave. The set of bits describing the design or the particular part of the design is (when embodied in a machine-readable medium such as a carrier or storage medium) an article that may be sold in and of itself or used by others for further design or fabrication.

Examples

The following examples pertain to further embodiments.

Example 1 is a system for managing maintenance activities on system on a chip (SoC). The system contains a processor. The processor is designed to restrict maintenance activities from occurring during the low-power state when not in a maintenance window, and determine whether to send a notification of the maintenance window. The system is also designed to generate a maintenance window notification, and when a maintenance action occurs during the maintenance window, transition the computing system to an active state and perform the maintenance action.

In Example 2, the subject matter of Example 1 or any of the Examples described herein may further include a graphics interface and a central processing unit (CPU) interface, both interfaces designed to provide power state information through an application programming interface (API).

In Example 3, the subject matter of Example 1 or any of the Examples described herein may further include an operating system interface designed to provide power state information.

In Example 4, the subject matter of Example 1 or any of the Examples described herein may further include a notification interface designed to receive registrations for notifications of the maintenance window.

Example 5 is the subject matter of Example 4 or any of the Examples described herein, where the notification interface is designed to trigger at a specific time, trigger on a network event, periodically trigger based on a period, or periodically trigger based on a percentage of time for a maintenance window.

Example 6 is a system of any of Examples 1-4, where the request is from an operating system.

Example 7 is a system of any of Examples 1-4, where the low-power state is a platform C10 state.

Example 8 is a system of any of Examples 1-4, where to restrict the maintenance activities from occurring further includes communicating to legacy devices that AC is not present when outside of maintenance window.

Example 9 is a system of any of Examples 1-4, where to generate the maintenance window notification further includes communicating to legacy devices that AC is present when inside of the maintenance window.

Example 10 is a system of any of Examples 1-4, where the low-power state includes a platform S0ix state.

Example 11 is a system of any of Examples 1-4, where the low-power state includes a package C10 state.

Example 12 is an apparatus of a computing system designed to provide a maintenance window. The apparatus includes a processor. The processor is designed to select a maintenance window for maintenance activities of the computing system and detect an idle state of the computing system outside of a maintenance window. The processor is also designed to transition devices of the computing system to a low-power device state, transition a central processing unit of the computing system to a low-power C state, and transition the computing system to a low-power platform state. The processor is further designed to restrict maintenance activities from occurring until within a maintenance window, register one or more systems for notification of a maintenance window through an application programming interface (API), and notify one or more systems of the maintenance window.

Example 13 is the subject matter of Example 12 or any of the Examples described herein, where to restrict the maintenance activities from occurring further includes communicating to unregistered systems that AC is not present when outside of maintenance window.

Example 14 is the subject matter of Example 12 or any of the Examples described herein, where to generate the maintenance window notification further includes communicating to unregistered systems that AC is present when inside of the maintenance window.

Example 15 is the subject matter of Example 12 or any of the Examples described herein, where the low-power device state is a runtime D3 (RTD3) state.

Example 16 is the subject matter of Example 12 or any of the Examples described herein, where the low-power C state is a C6 state.

Example 17 is the subject matter of Example 12 or any of the Examples described herein, where the low-power platform state is a C10 state.

Example 18 is the subject matter of Example 12 or any of the Examples described herein, where selecting the maintenance window further includes comprises selecting a periodic maintenance window.

Example 19 is the subject matter of Example 12 or any of the Examples described herein, where selecting the maintenance window further includes selecting a trigger based maintenance window.

Example 20 is the subject matter of Example 12 or any of the Examples described herein, where the processor is also designed to transition the computing system to an active state during the maintenance window, and perform maintenance activities during the maintenance window.

Example 21 is the subject matter of Example 20 or any of the Examples described herein, where transitioning the computing system to the active state further includes transition devices of the computing system to a runtime D0 (RTD0) state, transition a central processing unit of the computing system to a C0 state, and transition the computing system to a C0 platform state.

Example 22 is a computer program product. The computer program product includes a computer-readable storage medium. The computer-readable storage medium stores instructions for execution by a processor to perform power management operations of a system on a chip (SoC), the operations, which, when executed by the processor, perform a method. The method includes transitioning the SoC to a low-power state, restricting maintenance activities from occurring during the low-power state when not in a maintenance window, and determining to send a notification of the maintenance window. The method also includes generating a maintenance window notification, and, when a maintenance action occurs during the maintenance window, transitioning the SoC to an active state and performing the maintenance action.

Example 23 is the subject matter of Example 22 or any of the Examples described herein, where determining to send a notification of a maintenance window further includes triggering the maintenance window on an event.

Example 24 is the subject matter of Example 23 or any of the Examples described herein, where triggering the maintenance window on the event further includes receiving a network event trigger.

Example 25 is the subject matter of Example 23 or any of the Examples described herein where triggering the maintenance window on the event further includes receiving a periodic trigger.

In Example 26, the subject matter of Example 22 or any of the Examples described herein may further include setting a maintenance window duration.

In Example 27, the subject matter of Example 22 or any of the Examples described herein may further include setting a maintenance window load, which load represents a percentage of time in which to allow maintenance windows.

In Example 28, the subject matter of Example 22 or any of the Examples described herein may further include providing the notification to an operating system.

Example 29 is the subject matter of Example 22 or any of the Examples described herein, where the operating system is designed to provide an application programming interface (API) to allow registration for notification of the maintenance window.

Example 30 is an apparatus for transitioning to a low-power state. The apparatus includes a procedure for transitioning the system on a chip (SoC) to a low-power state, and a procedure for restricting maintenance activities from occurring during the low-power state when not in a maintenance window. The apparatus also includes a procedure determining whether to send a notification of the maintenance window and a procedure for generating a maintenance window notification. The apparatus further includes a procedure for transitioning the SoC to an active state when a maintenance action occurs during the maintenance window, and a procedure for performing the maintenance action when the maintenance action occurs during the maintenance window.

In Example 31, the subject matter of Example 30 or any of the Examples described herein may further include a procedure for registering a maintenance window notification for a system designed to perform maintenance actions.

Example 32 is a method of transitioning to a low-power state. The method includes restricting maintenance activities from occurring during the low-power state when not in a maintenance window, and determining whether to send a notification of the maintenance window. The method also includes generating a maintenance window notification, and when a maintenance action occurs during the maintenance window, transitioning the computing system to an active state and allowing the maintenance action.

In Example 33, the subject matter of Example 32 or any of the Examples described herein may further include registering a maintenance window notification for a system designed to perform maintenance actions.

Example 34 is an apparatus including a procedure to perform a method as identified in any of Examples 32-33.

Example 35 is a machine-readable storage including machine-readable instructions, which, when executed, implement a method or realize an apparatus as identified in any of Examples 32-33.

Example 36 is a machine-readable medium including code, which, when executed, cause a machine to perform the method of any of Examples 32-33.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an API, reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles of the embodiments described herein. The scope of the present description should, therefore, be determined by the following claims.

The invention claimed is:

1. A system for managing maintenance activities on system on a chip (SoC), the system comprising:
    a processor configured to:
        restrict maintenance activities from occurring during a low-power state when not in a maintenance window;

determine to send a notification of the maintenance window;

generate a maintenance window notification, wherein to generate the maintenance window notification comprises to communicate to legacy devices that alternating current (AC) is present when inside of the maintenance window; and when a maintenance action occurs during the maintenance window,
- transition the system to an active state; and
- perform the maintenance action.

2. The system of claim 1, further comprising a graphics interface and a central processing unit (CPU) interface, both interfaces configured to provide power state information through an application programming interface (API).

3. The system of claim 1, further comprising an operating system interface, the operating system interface configured to provide power state information.

4. The system of claim 1, further comprising a notification interface configured to receive registrations for notifications of the maintenance window.

5. The system of claim 4, wherein the notification interface is configured to trigger at a specific time, trigger on a network event, periodically trigger based on a period or periodically trigger based on a percentage of time for a maintenance window.

6. The system of claim 1, wherein to restrict the maintenance activities from occurring further comprises the processor to communicate to the legacy devices that the AC is not present when outside of the maintenance window.

7. An apparatus of a computing system configured to provide a maintenance window, the apparatus comprising:

a processor configured to:
- select the maintenance window for maintenance activities of the computing system;
- detect an idle state of the computing system outside of the maintenance window;
- transition devices of the computing system to a low-power device state;
- transition a central processing unit of the computing system to a low-power C state;
- transition the computing system to a low-power platform state;
- restrict maintenance activities from occurring until within the maintenance window, wherein to restrict the maintenance activities from occurring further comprises the processor to communicate to unregistered systems that alternating current (AC) is not present when outside of the maintenance window;
- register one or more systems for notification of the maintenance window through an application programming interface (API); and
- notify the one or more systems of the maintenance window.

8. The apparatus of claim 7, wherein to regenerate the maintenance window notification further comprises the processor to communicate to the unregistered systems that the AC is present when inside of the maintenance window.

9. The apparatus of claim 7, wherein the low-power device state is a runtime D3 (RTD3) state.

10. The apparatus of claim 7, wherein the low-power platform state is a C10 state.

11. The apparatus of claim 7, wherein to select the maintenance window further comprises the processor to select a periodic maintenance window.

12. The apparatus of claim 7, wherein to select the maintenance window further comprises the processor to select a trigger based maintenance window.

13. The apparatus of claim 7, wherein the processor is further configured to:
- transition the computing system to an active state during the maintenance window; and
- perform maintenance activities during the maintenance window.

14. The apparatus of claim 13, wherein to transition the computing system to the active state further comprises the processor to:
- transition devices of the computing system to a runtime D0 (RTD0) state;
- transition a central processing unit of the computing system to a C0 state; and
- transition the computing system to a C0 platform state.

15. A computer program product comprising a non-transitory computer-readable storage medium that stores instructions for execution by a processor to perform power management operations of a system on a chip (SoC), the operations, when executed by the processor, to perform a method, the method comprising:

transitioning the SoC to a low-power state;

setting a maintenance window load, the maintenance window load representing a percentage of time in which to allow maintenance windows;

restricting maintenance activities from occurring during the low-power state when not in a maintenance window;

determining to send a notification of the maintenance window;

generating a maintenance window notification; and when a maintenance action occurs during the maintenance window,
- transitioning the SoC to an active state; and
- performing the maintenance action.

16. The computer program product of claim 15, wherein determining to send the notification of the maintenance window further comprises triggering the maintenance window on an event.

17. The computer program product of claim 16, wherein triggering the maintenance window on the event further comprises receiving a network event trigger.

18. The computer program product of claim 16, wherein triggering the maintenance window on the event further comprises receiving a periodic trigger.

19. The computer program product of claim 15, further comprising setting a maintenance window duration.

20. The computer program product of claim 15, further comprising providing the notification to an operating system.

21. The computer program product of claim 15, wherein an operating system is configured to provide an application programming interface (API) to allow registration for notification of the maintenance window.

\* \* \* \* \*